United States Patent
Guillaume et al.

(10) Patent No.: US 9,654,975 B2
(45) Date of Patent: May 16, 2017

(54) METHOD AND DEVICE FOR AUTHENTICATING A MOBILE DEVICE

(71) Applicant: Robert Bosch GmbH, Stuttgart (DE)

(72) Inventors: Rene Guillaume, Well der Stadt (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/746,180

(22) Filed: Jun. 22, 2015

(65) Prior Publication Data

US 2015/0382192 A1 Dec. 31, 2015

(30) Foreign Application Priority Data

Jun. 25, 2014 (DE) .................. 10 2014 212 229

(51) Int. Cl.
*H04W 12/06* (2009.01)
*H04W 36/24* (2009.01)
*H04W 12/04* (2009.01)

(52) U.S. Cl.
CPC ............ *H04W 12/06* (2013.01); *H04W 12/04* (2013.01)

(58) Field of Classification Search
CPC ... H04W 12/06; H04W 76/023; H04W 88/08; H04W 76/02; H04W 72/005; H04W 12/04; H04W 60/04; H04W 84/18; H04L 12/189; H04L 61/2007; H04L 45/74
USPC ................. 455/410–411, 414.1–414.4, 436
See application file for complete search history.

(56) References Cited

U.S. PATENT DOCUMENTS

| | | | |
|---|---|---|---|
| 9,098,678 B2 * | 8/2015 | Hao | H04L 9/3213 |
| 2010/0138661 A1 * | 6/2010 | Tsai | H04L 9/0844 |
| | | | 713/171 |
| 2011/0092185 A1 | 4/2011 | Garskof | |
| 2012/0040639 A1 * | 2/2012 | Brisebois | H04W 48/02 |
| | | | 455/408 |
| 2015/0319665 A1 * | 11/2015 | Bonneville | H04W 36/0038 |
| | | | 455/411 |
| 2016/0274215 A1 * | 9/2016 | Edge | G01S 1/66 |

* cited by examiner

*Primary Examiner* — Khawar Iqbal
(74) *Attorney, Agent, or Firm* — Gerard Messina

(57) ABSTRACT

A method for authenticating a mobile device includes: probing by the mobile device a fading channel which connects the mobile device to a first radio base station; determining a secret held in common with the first radio base station as a function of a physical property of the fading channel; storing the in-common secret; receiving a first request for the in-common secret from a second radio base station; and, in response to the first request, sending a proof of knowledge of the in-common secret to the second radio base station.

9 Claims, 1 Drawing Sheet

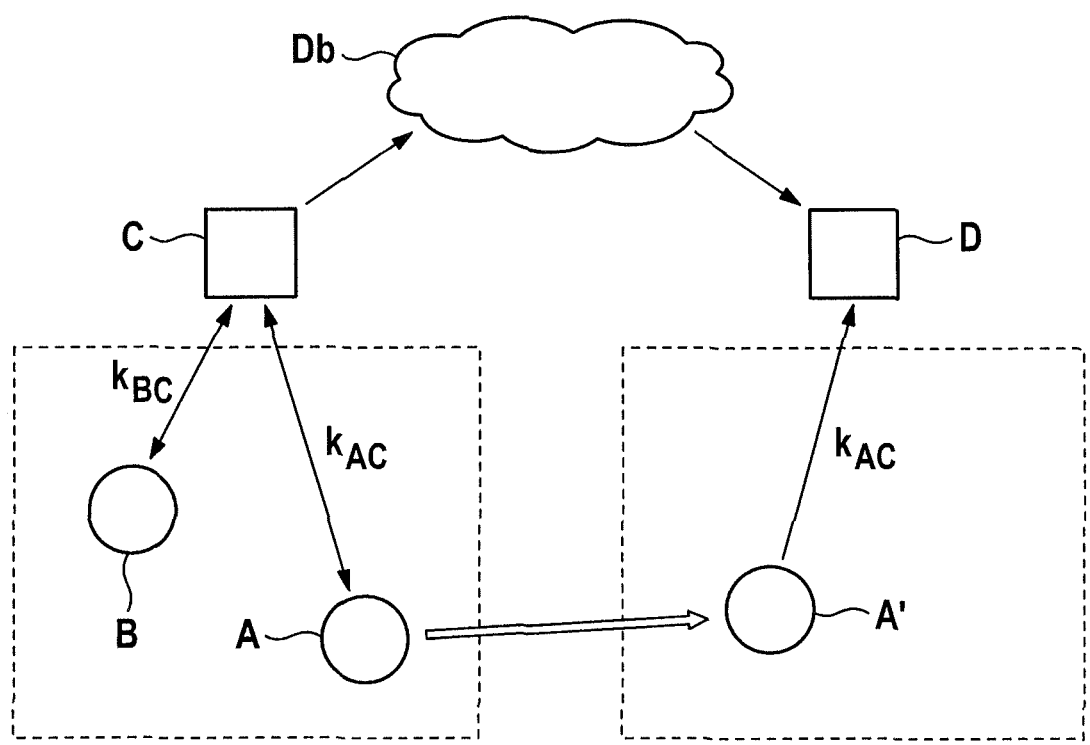

METHOD AND DEVICE FOR AUTHENTICATING A MOBILE DEVICE

BACKGROUND OF THE INVENTION

1. Field of the Invention

The present invention relates to a device and a method for authenticating a mobile device.

2. Description of the Related Art

In the technical field of IT security, verification of a claimed property of an entity, for instance, a communication partner, is called an authentication. The term authentication may also encompass the contribution made by the entity to be authenticated toward its authentication. Authentication may refer to the most diverse properties, particularly to the spatial position of the respective entity, and, in case of success, justifies its authorization, which may be, for example, the concession or delegation of certain authorizations to the entity that has been established as authentic.

In this connection, US Patent Application Publication No. 20110092185 A1 provides various systems and methods for location-based authentication of a mobile terminal unit. For this purpose, the concept is introduced of a central location token service (LTS), which forces a renewed authentication of the mobile device as soon as it moves away over a specified distance from the position of its last contact, within a certain time interval. For this purpose, the mobile device transmits a universally unique identifier (UUID), a user name, a telephone number as well as a password to the location token service, which uses these data for the duration of the user session, for identifying the mobile device as well as its user.

Such approaches, known from the related art, are met with understandable concerns from the perspective of data privacy laws particularly in the more recent past. In this respect, apart from great complexity and limited user-friendliness, the cited method is above all fraught with a great potential for misuse. Thus, the exchange of unique unit names and user names via the wireless and thus inherently insecure communication channel between the mobile device and the location token service, allows a conceivable attacker not only to identify a certain device, but even to track its movements over the entire duration of the user session. Consequently, such an approach opens, not only to the location token service itself, but even to unauthorized people, by way of data collection and data combination, the possibility of establishing complete movement profiles, which, in turn, allow for the tracking of position changes and possibly even actions of users, and thereby to monitor them.

BRIEF SUMMARY OF THE INVENTION

The object of the present invention to make possible the tracking of a mobile device without disclosing its identity. The present invention additionally has the objectives of authenticating such a mobile device, without the mentioned disadvantages, on the basis of its position, as well as to transmit its authorizations to a neighboring device in a secure manner.

For the purpose of this exposition, the terms "mobile device" or "mobile terminal unit" should be understood in their general sense in the context of information technology and communication technology and include any device that, due to its size or its weight, is portable without greater bodily effort, and is thus usable in a mobile manner. This, therefore, covers particularly conventional mobile computers and the most diverse handheld devices (handhelds) as well as the most diverse types and shapes of computer systems wearable on the person of the user (wearables).

One advantage of this design approach is to be seen primarily in a data privacy protection level that is improved compared to conventional location-based authentication methods. Moreover, the approach of the present invention also proves to be uncomplicated and user-friendly, and thus corresponds in large measure to the requirements on current cyber-physical systems.

Advantageous further developments of the present invention allows for embedding the proposed method in wireless infrastructures common in households without special requirements in hardware. The present invention further allows integration of the respective local networks into a comprehensive data base architecture in the sense of a superordinated Trust Center.

BRIEF DESCRIPTION OF THE DRAWING

The FIGURE shows the exemplary application of an authentication method according to the present invention.

DETAILED DESCRIPTION OF THE INVENTION

The system environment, illustrated in the schematic simplification of the FIGURE, structurally includes a central data base Db, which on one hand is in connection with a first base station C, and on the other hand with a second base station D that is at a distance from the first base station C, whose respective operating ranges are symbolized in a simplified manner by rectangles bordered by dashed lines. As a data base, in this connection, one should understand in broader usage any electronic system suitable for data management. Thus, data base Db under discussion does not necessarily meet the requirements of a specific data base model, such as a relational one. Rather, data base Db may likewise be a data file managed in other ways, for instance, a simple data file.

In a corresponding manner, the term base station is also in no way to be regarded in the narrow sense of the word as a mobile radio transmitting system of a GSM net, a UMTS net, a WiMAX net, an LTE net or a TETRA net. One should rather consider any essentially stationary transmitting device for radio signals of mobile radio networks, cordless telephones or various wireless networks. Even terminal units networked in Personal Area Networks, for example networked by Bluetooth in a piconet, should be understood in the following expressly as base stations, provided one may assume a largely static installation.

As may easily be recognized in the FIGURE, a mobile device A is initially located within the radio range of first base station C, the interplay of sending and receiving units of mobile device A and first base station C constituting an information-theoretical channel between partners A, C. Based on the fluctuations in the mutual received field strength caused by interference, shielding, multipath propagations or the Doppler Effect, this transmission path should be characterized in the electrotechnical sense as a fading channel.

Because of the mutual exchange of probing signals over the fading channel connecting them, mobile device A and first base station C assess its physical properties within a common, narrowly defined time window. This exchange may be initiated, for example, by the operation of a push-button switch provided for this.

The procedure described permits mobile device A, on the one hand, and first base station C, on the other hand, to derive a shared secret $k_{AC}$, common to the two communication partners, based on these properties accessible only to them. Methods suitable for this, typically methods operating on the physical layer (PHY) of the OSI model, according to the related art, for instance, find application for encrypting messages or for calculating message authentication codes (MAC), and are thus sufficiently familiar to one skilled in the art from other contexts. Known methods of this type utilize the circumstance that even an additional mobile device B that is also located within the radio range of first base station C would with great probability not be in a position, after the exchange of corresponding probing signals with first base station C, to infer, from its own measurements, the common secret $k_{AC}$ of first radio base station C with mobile device A. Rather additional mobile device B, already in the case of a slightly deviating position, or at a later point in time, would arrive at a totally independent secret $k_{AC}$.

The common secret $k_{AC}$ of mobile device A with first radio base station C, which may be shown, for example, in the form of a substantially accidental-seeming bit sequence, is now filed by mobile device A in its local device storage unit and transmitted by radio base station C to central data base Db.

In the present scenario, symbolized by a bordered arrow, mobile device A is thereupon brought into a new position A' in the sending range of second base station D. The latter is caused thereby to request common secret $k_{AC}$ from the mobile device that is now designated as A'. Mobile device A' receives the respective (first) request from second base station D and proves its knowledge of common secret $k_{AC}$.

Second base station D also sends a second request to data base Db, in order to let this independent entity confirm the authenticity of the common secret $k_{AC}$. Data base Db, which had previously received common secret $k_{AC}$ from first radio base station C and stored it in a suitable manner, upon the second request, sends common secret $k_{AC}$ to second base station D. Alternatively, data base Db checks the knowledge of secret $k_{AC}$ by the mobile device at position A'.

Second base station D is therefore in a position, by a comparison of the values $k_{AC}$, received upon the first and second request, to check the assumption that mobile device A' was previously located within radio range of first base station C. The measure required for this of agreement of the bit sequences supplied by data base Db and mobile device A', in this context, is not given exclusively in the case of absolute identity. Rather, the marked similarity of the two bit sequences may already justify the authorization of mobile device A' by second base station D.

What is claimed is:

1. A method for authenticating a mobile device, comprising:
   probing, by the mobile device, a fading channel which connects the mobile device to a first radio base station;
   determining, by the mobile device, a secret the mobile device has in common with the first radio base station by deriving the secret from a physical property of the fading channel assessed by the mobile device within a time window defined in common with the first radio base station, wherein derivation of the secret yields a bit sequence dependent on a position of the mobile device during the time window;
   storing, by the mobile device, the common secret;
   receiving, by the mobile device, a first request for the common secret from a second radio base station; and
   sending, by the mobile device, upon the first request, a proof of knowledge of the common secret to the second radio base station.

2. The method as recited in claim 1, further comprising:
   probing, by the first radio base station, the fading channel;
   determining, by the first radio base station, the common secret;
   sending, by the first radio base station, the common secret to a database;
   sending, by the second radio base station, the first request to the mobile device;
   sending, by the second radio base station, a second request for the common secret to the database;
   receiving, by the second radio base station, the proof of knowledge of the common secret from the mobile device;
   receiving, by the second radio base station, the common secret from the database; and
   if the common secret received in response to the first request agree with the common secret received in response to the second request, authorizing, by the second radio base station, the mobile device as an authenticated device.

3. The method as recited in claim 2, further comprising:
   receiving, by the data base, the common secret from the first radio base station;
   storing, by the database, the common secret;
   receiving, by the database, the second request from the second radio base station; and
   upon receiving the second request, sending by the database the common secret to the second radio base station.

4. The method as recited in claim 3, wherein the second radio base station sends the first request to the mobile device as soon as the mobile device is located within a sending range of the second radio base station.

5. The method as recited in claim 2, wherein the probing of the fading channel includes exchange of probing signals between the first radio base station and the mobile device via the fading channel.

6. The method as recited in claim 2, wherein:
   the mobile device includes an operating element; and
   the mobile device initiates the method if an operation of the operating element is detected.

7. The method as recited in claim 2, wherein a bit sequence represents the common secret.

8. A device for authentication of a mobile device, comprising:
   a controller including a processor configure to:
   probe a fading channel connecting a mobile device to a first radio base station;
   determine a common secret of the mobile device with the first radio base station by deriving the common secret from a physical property of the fading channel assessed by the mobile device within a time window defined in common with the first radio base station, wherein derivation of the common secret yields a bit sequence dependent on a position of the mobile device during the time window;
   store the common secret on the mobile device;
   receive a first request for the common secret from a second radio base station to the mobile device; and
   send a proof of knowledge of the common secret from the mobile device to the second radio base station.

9. A non-transitory, computer-readable data-storage medium storing a computer program having program codes which, when executed on a computer, perform a method for the authentication of a mobile device, the method comprising:
- probing, by the mobile device, a fading channel which connects the mobile device to a first radio base station;
- determining, by the mobile device, a secret the mobile device has in common with the first radio base station by deriving the secret from a physical property of the fading channel assessed by the mobile device within a time window defined in common with the first radio base station, wherein derivation of the secret yields a bit sequence dependent on a position of the mobile device during the time window;
- storing, by the mobile device, the common secret;
- receiving, by the mobile device, a first request for the common secret from a second radio base station; and
- sending, by the mobile device, upon the first request, a proof of knowledge of the common secret to the second radio base station.

* * * * *